US012440414B2

(12) United States Patent
Au et al.

(10) Patent No.: US 12,440,414 B2
(45) Date of Patent: Oct. 14, 2025

(54) DUAL-PURPOSE PHYSIOTHERAPY INSTRUMENT WITH BALANCE AND VIBRATION FUNCTIONS

(71) Applicant: CONTIN TECHNOLOGY LIMITED, Shatin (HK)

(72) Inventors: Chung-Wing Au, Shatin (HK); Sin-Yun Au, Shatin (HK); Wing-Hoi Cheung, Shatin (HK); Kwoon-Ho Simon Chow, Shatin (HK); Cheng-Kiu Ho, Shatin (HK)

(73) Assignee: CONTIN TECHNOLOGY LIMITED, Shatin (HK)

( * ) Notice: Subject to any disclaimer, the term of this patent is extended or adjusted under 35 U.S.C. 154(b) by 821 days.

(21) Appl. No.: 17/732,189

(22) Filed: Apr. 28, 2022

(65) Prior Publication Data

US 2023/0346626 A1 Nov. 2, 2023

(51) Int. Cl.
*A61H 1/00* (2006.01)
*A61H 23/02* (2006.01)
(Continued)

(52) U.S. Cl.
CPC ............. *A61H 1/005* (2013.01); *A61H 23/02* (2013.01); *A63B 26/003* (2013.01); *H02J 50/10* (2016.02);
(Continued)

(58) Field of Classification Search
CPC .......... A61H 1/005; A61H 1/003; A61H 1/00; A61H 1/001; A61H 23/02; A61H 23/00;
(Continued)

(56) References Cited

U.S. PATENT DOCUMENTS

| | | | | |
|---|---|---|---|---|
| 4,463,946 A * | 8/1984 | Wallace | ................. | A63B 22/16 434/258 |
| 4,635,932 A * | 1/1987 | Dewees | ................. | A63B 22/18 482/79 |

(Continued)

FOREIGN PATENT DOCUMENTS

| | | |
|---|---|---|
| CN | 204307320 U | 5/2016 |
| CN | 207385886 U | 5/2018 |

(Continued)

*Primary Examiner* — Tu A Vo
*Assistant Examiner* — Kelsey E Baller
(74) *Attorney, Agent, or Firm* — MUNCY, GEISSLER, OLDS & LOWE, P.C.

(57) ABSTRACT

A dual-purpose physiotherapy instrument includes a base, electromagnetic drives, a plate body and a movable board. The plate body is mounted on the upper end of the base. A surface of the plate body away from the base includes stoppers. The movable board is mounted to the plate body in a detachable manner. A first surface on the movable board includes limit holes that are matched with the stoppers. The middle part of a second surface opposite to the first surface includes a protruding portion. When the first surface of the movable board is mounted to the plate body, the movable board can integrally vibrate up and down. When the second surface of the movable board is mounted to the plate body, the protruding portion is pressed against the plate body to cause the two ends of the movable board to swing up and down relative to the support portion.

17 Claims, 6 Drawing Sheets

(51) Int. Cl.
*A63B 26/00* (2006.01)
*H02J 50/10* (2016.01)

(52) U.S. Cl.
CPC ................ *A61H 2201/5092* (2013.01); *A61H 2201/5097* (2013.01); *A61H 2203/0406* (2013.01); *A63B 2213/00* (2013.01)

(58) Field of Classification Search
CPC .... A61H 2201/5092; A61H 2201/5097; A61H 2201/1207; A61H 2203/0406; A63B 26/003; A63B 2213/00; A63B 2071/0072; A63B 2071/009; A63B 2220/18; A63B 2220/805; A63B 2220/803; A63B 2225/50; A63B 21/00196; A63B 21/0052; A63B 22/18; A63B 26/00
See application file for complete search history.

(56) References Cited

U.S. PATENT DOCUMENTS

| | | | | | |
|---|---|---|---|---|---|
| 5,765,921 | A * | 6/1998 | Chuang | A47C 16/025 | 297/423.46 |
| 6,413,197 | B2 * | 7/2002 | McKechnie | A63B 22/18 | 482/146 |
| 11,097,153 | B1 * | 8/2021 | Lee | A63B 22/18 | |
| 11,383,128 | B2 * | 7/2022 | Wilson | A63B 26/003 | |
| 2004/0092849 | A1 * | 5/2004 | Talish | A61H 1/005 | 601/90 |
| 2006/0217640 | A1 * | 9/2006 | Trandafir | A61H 1/001 | 601/84 |
| 2009/0091410 | A1 | 4/2009 | Leung et al. | | |
| 2011/0152731 | A1 * | 6/2011 | Ochi | A63B 21/00178 | 601/5 |
| 2018/0200569 | A1 * | 7/2018 | Blitstein | A63B 26/003 | |
| 2019/0175983 | A1 * | 6/2019 | Carr | A63B 22/18 | |
| 2021/0268337 | A1 * | 9/2021 | Shoffler | A63B 26/003 | |
| 2022/0313546 | A1 * | 10/2022 | Spencer | A61H 23/02 | |

FOREIGN PATENT DOCUMENTS

| | | | | |
|---|---|---|---|---|
| CN | 109966091 | A * | 7/2019 | |
| CN | 209951708 | U | 1/2020 | |
| CN | 118750355 | A * | 10/2024 | |
| WO | WO-2011116755 | A2 * | 9/2011 | A61H 1/003 |

* cited by examiner

DUAL-PURPOSE PHYSIOTHERAPY INSTRUMENT WITH BALANCE AND VIBRATION FUNCTIONS

TECHNICAL FIELD

The present invention relates to the field of household physiotherapy equipment, particularly to a dual-purpose physiotherapy instrument with balance and vibration functions.

BACKGROUND ART

Physiotherapy instrument is a device that applies physical factors to the human body to improve the condition of the human body. It is suitable for homes, offices and other places. Common physical factors include electricity, sound, light, magnetism, water and pressure. Compared with drug therapy, physical therapy is relatively safe and environmentally friendly, but different from drug therapy, physical therapy is very effective for some diseases, for example, improving the function of human organs or the state of local tissues of the human body by improving blood circulation.

Vibrators and balance boards are sold in the market. The vibrators are tools that produce physical stimulation to muscles and bones and can prevent and treat muscle and bone diseases at a certain amplitude, while the balance boards can effectively train user's coordination and help to develop user's balance and coordinate their muscles. Over time, people's bones, muscles or cerebellum will degenerate or be calcified with age, and more severely, Alzheimer's disease may occur.

Prior patent US2009/0091410A1 provides a maglev vibration system, which achieves a better vibration effect based on the principle of maglev to improve bone density. In order to offset the impact of electromagnets on people, magnetic shielding measures are taken for the maglev vibration system in the prior patent, wherein the outer shell is made of a magnetic shielding material such as soft iron, so the general overall structure is very heavy and inconvenient to use. Further, the system only provides a vibration function.

Further, no device on the market can combine a vibrator with a balance board. Therefore, it is urgent to provide a multifunctional physiotherapy instrument for vibration and balance physiotherapy.

SUMMARY OF THE INVENTION

To address the defects of the prior art, the present invention provides a dual-purpose physiotherapy instrument with balance and vibration functions. Through the use of a movable board, dual physiotherapy of balance and vibration is realized, so as to facilitate middle-aged and elderly users to perform physiotherapy and make the use easier and not cause safety hazards.

In order to achieve the foregoing object, the present invention provides a dual-purpose physiotherapy instrument with balance and vibration functions, comprising a base, electromagnetic drives, a plate body and a movable board; the plate body is mounted on the upper end of the base to form an accommodating cavity structure between the plate body and the base for accommodating the electromagnetic drives, and a surface of the plate body away from the base is provided with stoppers; the movable board is mounted to the plate body in a detachable manner, a first surface on the movable board is provided with limit holes that are matched with the stoppers; a second surface opposite to the first surface is provided on the movable board, and the middle part of the second surface is provided with a protruding portion;

Particularly, when the first surface of the movable board is mounted to the plate body in a detachable manner, the movable board can integrally vibrate up and down under the action of the electromagnetic drives, and the stoppers cooperate with the limit holes to limit the vibration direction of the movable board; when the second surface of the movable board is mounted to the plate body in a detachable manner, the protruding portion is pressed against the plate body as a support portion to cause the two ends of the movable board to swing up and down relative to the support portion under the action of the electromagnetic drives, and the stoppers cooperate with the protruding portion to limit the connecting position of the protruding portion and the plate body. Preferably, the electromagnetic drives comprise electromagnets and permanent magnets, and the electromagnets are mounted inside the accommodating cavity structure; the permanent magnets are arranged at the bottom of the plate body and there are a plurality of the permanent magnets, which are distributed on the two sides of the movable board symmetrically to the protruding portion.

Preferably, the limit holes are hole-like structures or through-hole structures, and the protruding portion is a hemispherical structure.

Preferably, the movable board is provided with elastic cushions on the second surface, there are a plurality of the elastic cushions, which are distributed on both sides of the protruding portion, and the thickness of the elastic cushions is less than or equal to the radius of the protruding portion.

Preferably, the movable board is further provided with anti-skid pads on the first surface and/or the second surface; a plurality of anti-skid stripes or anti-skid portions are arranged on the anti-skid pads.

Preferably, a metal panel is arranged inside the movable board and covers the electromagnetic drives.

Preferably, the physiotherapy instrument further comprises a wireless charging device, comprising a charger, a battery and a charging coil; the battery and the charging coil are arranged in the middle part of the movable board, and the charger is arranged below the wireless charging coil.

Preferably, a sensor is arranged inside the movable board, mounted at a position corresponding to the protruding portion and used for sensing the inclination of the movable board; a Wi-Fi module is arranged inside the movable board and used for recording and transmitting data of the sensor.

Preferably, the plate body is an elongated structure, and a support rod is mounted inside the plate body to increase the strength of the plate body and extends at least along the width direction of the plate body.

Preferably, the movable board is an elongated structure, and the protruding portion is located in the middle position of the lengthwise direction of the movable board.

Preferably, a load-bearing rack is arranged inside the base to strengthen the support of the base to the plate body.

Preferably, the outer side of the base is provided with armrest clips that are fixedly connected to the base, and the armrest clips are used for connecting the base to external objects in a fixed manner.

Preferably, a far-infrared monitoring device is arranged inside the movable board to trigger the ON/OFF of the physiotherapy instrument.

Advantages of the present invention: Compared with the prior art, the dual-purpose physiotherapy instrument with balance and vibration functions provided by the present invention can be freely switched between a balance instrument and a vibrator by using different mounting modes of the movable board, to meet the use requirements of the users. More specifically, when a limit rack contacts the limit holes on the movable board, the physiotherapy instrument is switched to a vibration mode; when the limit rack contacts the protruding portion on another surface of the movable board, the physiotherapy instrument is switched to a balance mode. Further, both modes use electromagnets to cooperate with the permanent magnets mounted inside the movable board, so as to achieve up and down vibration or left and right balance of the movable board under the action of magnetic force, thereby achieving the effect of physical therapy.

DESCRIPTION OF REFERENCE SIGNS

Figure 1:
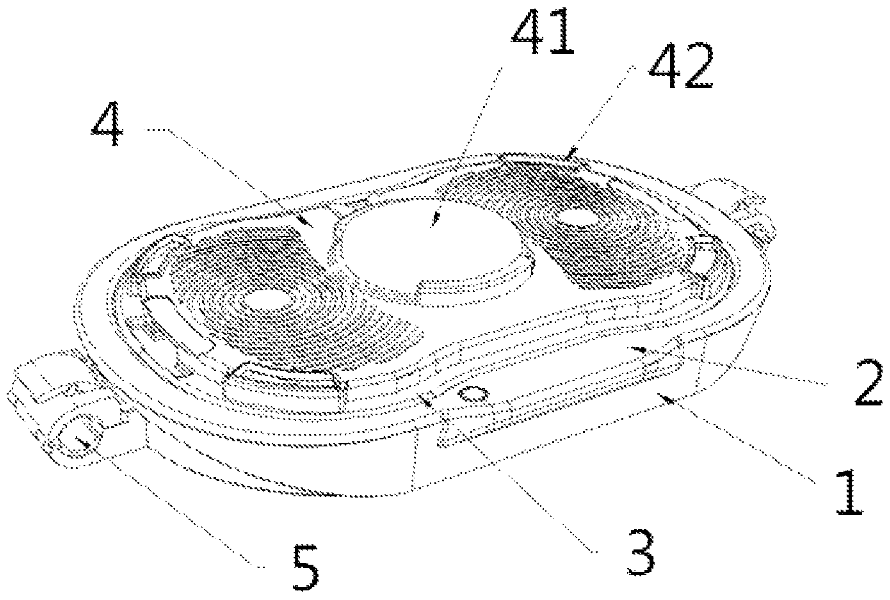
FIG. 1 is a main structure diagram of the dual-purpose physiotherapy instrument provided by the present invention.
Figure 2:
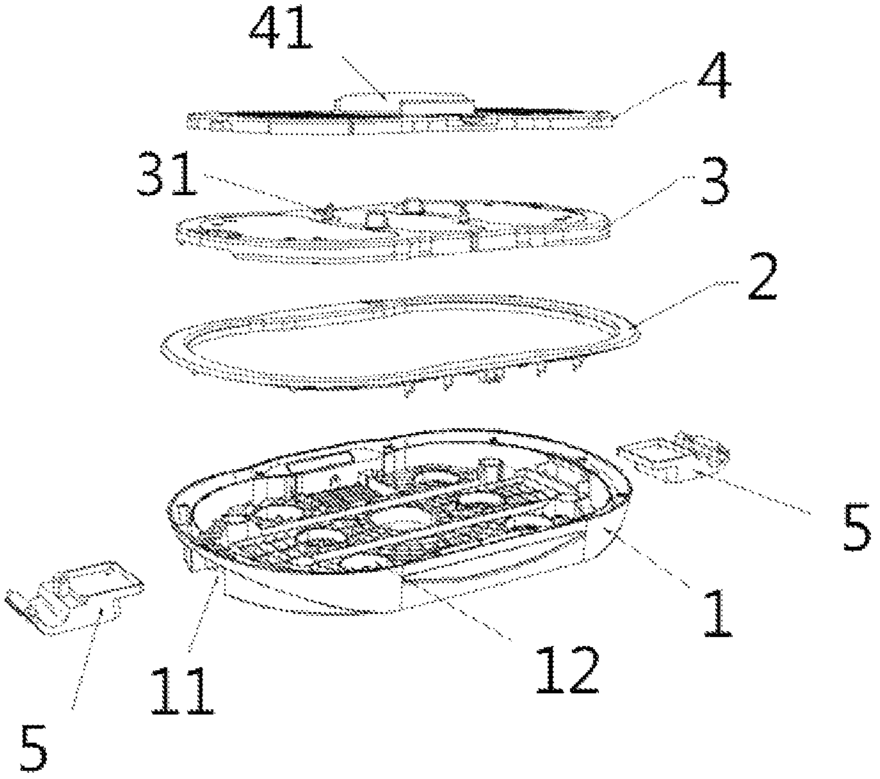
FIG. 2 is a structural exploded view of the dual-purpose physiotherapy instrument.
Figure 3:
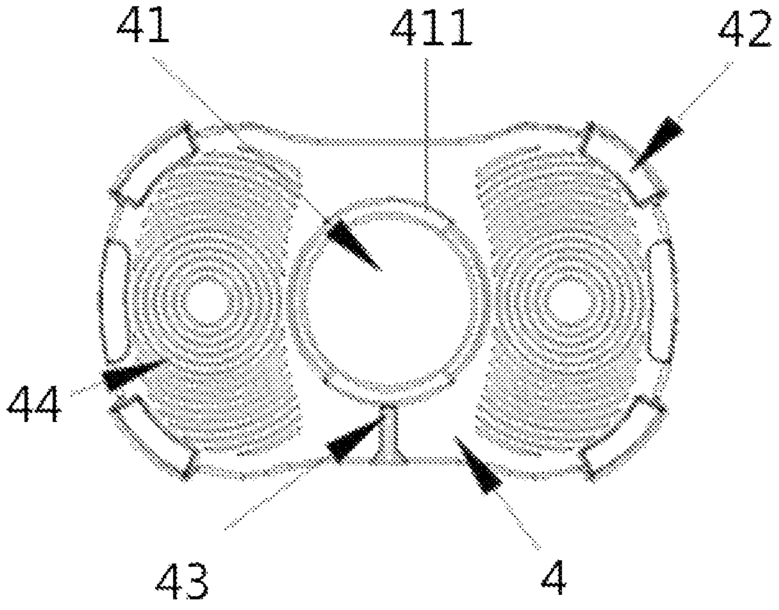
FIG. 3 is a structural bottom view of a movable board of the dual-purpose physiotherapy instrument, i.e., the second surface.
Figure 4:
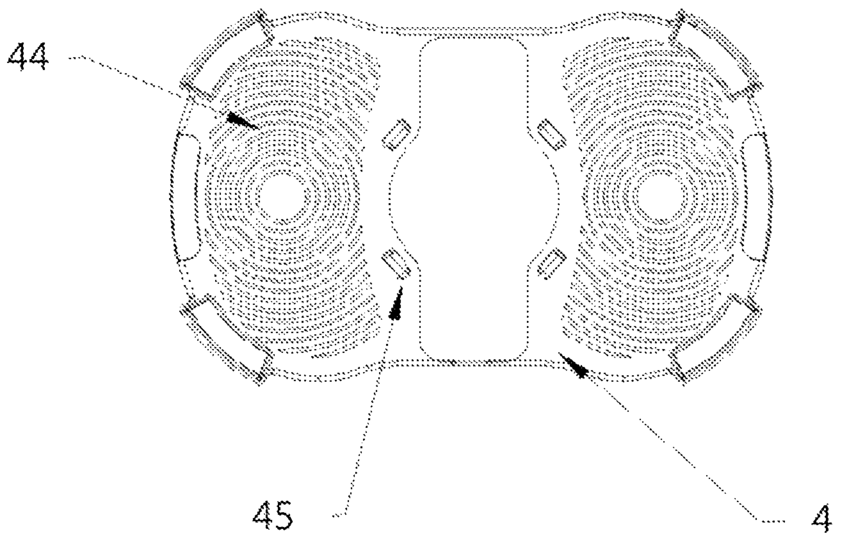
FIG. 4 is a structural top view of a movable board of the dual-purpose physiotherapy instrument, i.e., the first surface.
Figure 5:
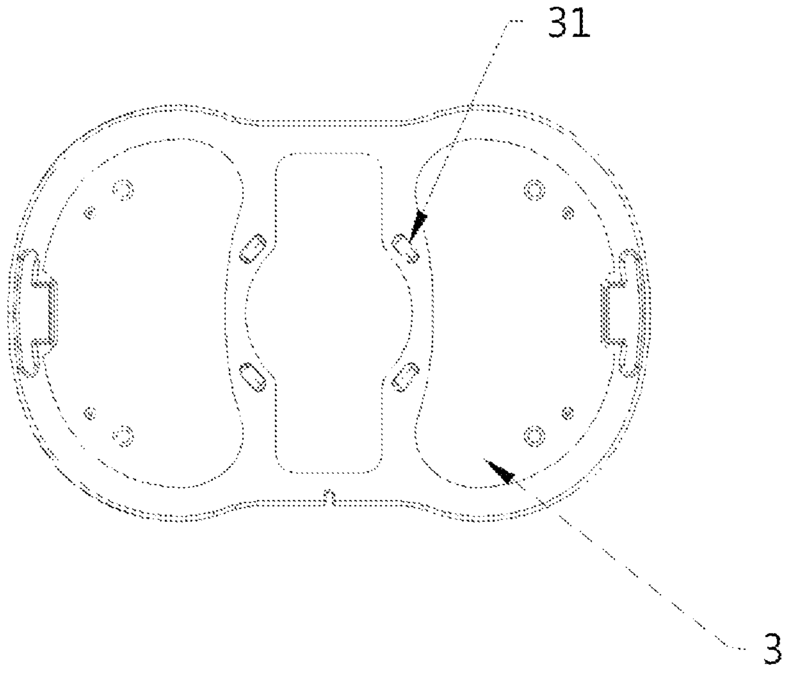
FIG. 5 is a structural top view of a plate body of the dual-purpose physiotherapy instrument.
Figure 6:
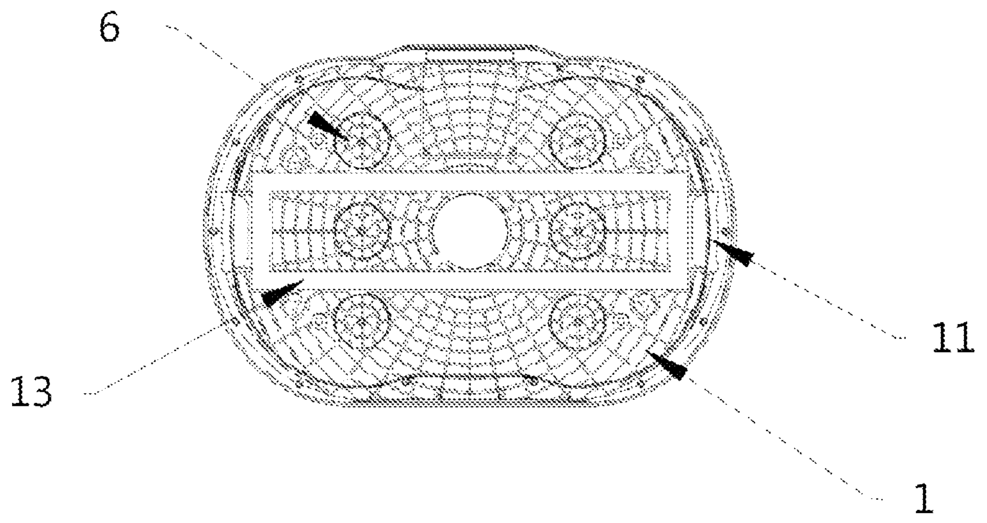
FIG. 6 is a structural top view of a base of the dual-purpose physiotherapy instrument.

1. base 2. casing 3. plate body 4. movable board 5. armrest clip 6. electromagnetic drive 11. external interface 12. accommodating opening 13. load-bearing rack 31. stopper 41. protruding portion 42. elastic cushion 43. data interface 44. anti-skid pad 45. limit hole 46. metal panel 47. metal panel 48. heat dissipation plate 411. baffle 51. charging coil 52. battery 53. charger

DETAILED DESCRIPTION

The present invention will be further illustrated by referring to accompanying drawings and embodiments so that the present invention will be more evident. Those skilled in the art can understand that unless otherwise declared, the singular forms "a", "one" and "the" as used in the text can also mean that the plural forms are included. It should be further understood that the expression "comprise", "include" or "contain" in the description of the present application indicates the existence of the stated features, integers, steps, operations, modules and/or components, but do not exclude the existence or addition of one or more other features, integers, steps, operations, modules, components and/or combinations thereof. It should be understood that the expression "and/or" used in the text includes all of one or more associated items set forth, or any unit and all combinations.

As shown in FIG. 1 to FIG. 6, the present invention provides a dual-purpose physiotherapy instrument with balance and vibration functions, comprising a base 1, electromagnetic drives 6, a plate body 3 and a movable board 4; the plate body 3 is buckled on the upper end of the base 1 to form an accommodating cavity structure, and the electromagnetic drives 6 are fixedly mounted inside the accommodating cavity structure; vibration generated by the electromagnetic drives 6 is transmitted to the movable board via the plate body 3; a surface of the plate body 3 facing the movable board is provided with a plurality of stoppers 31 symmetrically arranged on the plate body 3; a first surface on the movable board 4 is provided with limit holes 45 that are matched with the stoppers 31, and the middle part of a second surface opposite to the first surface is provided with a protruding portion 41; when the first surface of the movable board 4 is mounted to the plate body 3 in a detachable manner, the movable board 4 integrally vibrates up and down under the action of the electromagnetic drives 6, and the stoppers 31 cooperate with the limit holes 45 to limit the vibration direction of the movable board 4; when the second surface of the movable board 4 is mounted to the plate body 3 in a detachable manner, the protruding portion 41 is pressed against the plate body 3 as a support portion to cause the two ends of the movable board 4 to swing up and down relative to the support portion, and the stoppers 31 cooperate with the protruding portion 41 to limit the position where the protruding portion 41 is pressed against the plate body 3.

In another aspect, as the plate body 3 and the movable board 4 will bear violent vibration and user's weight during operation, the base 1 and the plate body 3 can be fixed with M8 screws, which are provided with anti-loosening parts, so that the plate body 3 can be fixed to the base 1 and meanwhile can vibrate to a limited extent.

In a specific implementation process, a casing 2 is arranged between the base 1 and the plate body 3 and cooperates with the plate body 3 to match the base 1 more conveniently, thereby obtaining a closed accommodating cavity structure to more effectively arrange components in the accommodating cavity and ensure the components in the accommodating cavity will not be affected by any object outside the physiotherapy instrument, display panel can also be installed on the casing for a better protection; a plurality of stoppers 31 are arranged circumferentially about a circular structure, thereby matching the protruding portion 41 in a better way. After the balance mode is switched to, the protruding portion 41 is snap-fit in the circular structure formed by the stoppers 31, so that the protruding portion 41 can shake left and right without detachment; the two surfaces of the movable board 4 are provided with different snap-fit structures to match the plate body 3, limit the movement of the movable board 4 to a limited extent and realize the switching between the balance mode and the vibration mode.

In this embodiment, the electromagnetic drives 6 comprise electromagnets and permanent magnets, and the electromagnets are mounted inside the accommodating cavity structure; the permanent magnets are arranged at the bottom of the plate body 3 and there are a plurality of permanent magnets, which are distributed on the two sides of the movable board 3 symmetrically, and the electromagnets are arranged inside the base 1 correspondingly, thereby achieving the vibration function under the magnetic action between the permanent magnets and the electromagnets. The vibration generated after each permanent magnet is subjected to a magnetic force is transferred to the movable board 4 by the plate body 3. Further, by manipulating the power supply of the electromagnets, a magnetic force that constantly changes direction can be generated to cause the permanent magnets to vibrate. By adjusting the power input to the electromagnets, the amplitude and frequency of the vibration can be controlled. This non-contact movement greatly reduces noise and reduces maintenance frequency compared with conventional devices utilizing rotational imbalance points.

In an embodiment, each upper and lower corresponding electromagnet and permanent magnet in the electromagnetic drives 6 form a group, 6 groups of magnets are symmetrically arranged on the left and right sides of the device, and 3 groups of the magnets on each side support the position of user's foot sole to ensure that in the vibration mode, the vibration is directly transferred to the user's foot soles as fulcrums to reduce the torque and prevent fall of the user due to excessive vibration amplitude. In another aspect, in addition to 3 groups on each side, 2 groups or 4 groups of magnets can be arranged on each side, too.

The limit holes 45 are hole-like structures, and the protruding portion 41 is a hemispherical structure; elastic cushions 42 are arranged beside the protruding portion 41, there are a plurality of the elastic cushions 42, which are distributed on both sides of the protruding portion 41, and the thickness of the elastic cushions 42 is less than or equal to the protruding portion 41. In an embodiment, under the cooperation of the protruding portion 41 and the elastic cushions 42, the movable board 4 and the plate body 3 maintain an inclination of at most six degrees, which can prevent excessive movement and inclination of the movable board 4, causing fall of the user by accident.

Anti-skid pads 44 are arranged on the movable board 4 and between the elastic cushions 42 and the protruding portion 41, or beside the limit holes 45; a plurality of anti-skid stripes are arranged on the anti-skid pads 44. The anti-skid pads can provide users with an anti-skid effect, which can provide more effective power transmission and cushioning in the vibration mode.

In this embodiment, the limit holes 45 are hole-like structures, which can not only effectively achieve the match with the stoppers 31, so that the stoppers 31 can be inserted and the movable board 4 can be mounted inside the plate body 3, but also do not affect the protruding portion 41, thereby being more pleasing to the eye and practical; the elastic cushions have high elasticity, while the protruding portion has high rigidity; when the user adopts a balance mode and puts one foot on the surface of the movable board 4, as there are the elastic cushions 4 and the height of the cushions does not exceed the dimension of the protruding portion 41, although the elastic cushions will be deformed under a stress, the user can put another foot in the period of full deformation of the elastic cushions, thereby avoiding imbalance caused by inconsistent height on a single side. Further, due to the strong deformability of the elastic cushions, the subsequent balance control will not be affected; further, baffles 411 are arranged beside the protruding portion 41, fit to the protruding portion 41 and mutually dislocated with the stoppers 31, so that the protruding portion 41 can only move in the left and right directions and cannot rotate after being mounted in the stoppers 31.

A sensor and a support rod are arranged inside the movable board 4, the support rod is arranged transversely, and the sensor is fixed inside the movable board 4. In this embodiment, the sensor is connected to an external device via a data interface 43, thereby achieving data interaction with the external device and providing electric energy for electronic devices inside the movable board 4. The support rod is arranged transversely, on the one hand the sensor can be fixed effectively and on the other hand the support rod can effectively enhance the entire movable board. Even if the movable board is made of a plastic material, the existence of the support rod enables the entire movable board to bear more mass, ensuring use safety; the sensor is mounted at the center of the movable board 4 and includes an acceleration sensor and a gyro sensor, thereby measuring acceleration and the inclination of the movable board.

In an embodiment, a Wi-Fi module is arranged on the movable board and achieves data communication with the sensor on the movable board and the control panel inside the accommodating cavity. In the vibration mode, the acceleration sensor and the electromagnets work together in a feedback loop, the acceleration sensor will measure the velocity of the vibration and the control panel will use the velocity to actively adjust the power input of the electromagnets and maintain the target amplitude of vibration, which is critical to medical efficacy. In the balance mode, the gyro sensor will measure the inclination of the movable board and report to the machine to perform relevant tests or exercises and carry out data statistics to check user's balance.

In an embodiment, the WIFI module can communicate with an external remote control device, allowing the user to remotely control the ON and OFF of the physiotherapy instrument. In a further embodiment, a far-infrared monitoring device is arranged on the movable board 4. When the user steps on the movable board, the far-infrared monitoring device is triggered and the physiotherapy instrument is activated, so as to achieve the function of automatic start of the physiotherapy instrument and reduce user's movement on the physiotherapy instrument to improve safety. Conversely, with the same setting, the function of automatic shut-off of the physiotherapy instrument is also available.

Figure 7A:
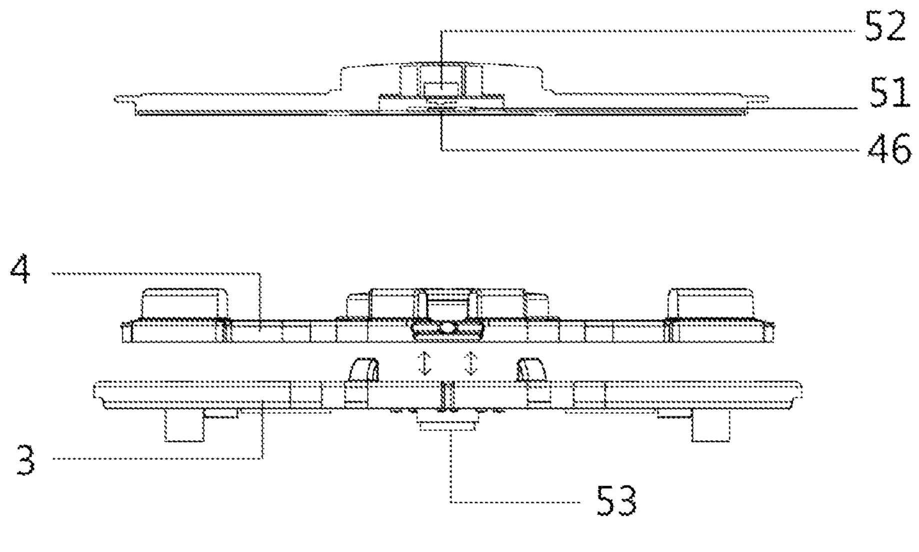
FIG. 7A is a section view of a side face of a movable board and side view of an embodiment with plate body of the dual-purpose physiotherapy instrument.
Figure 7B:
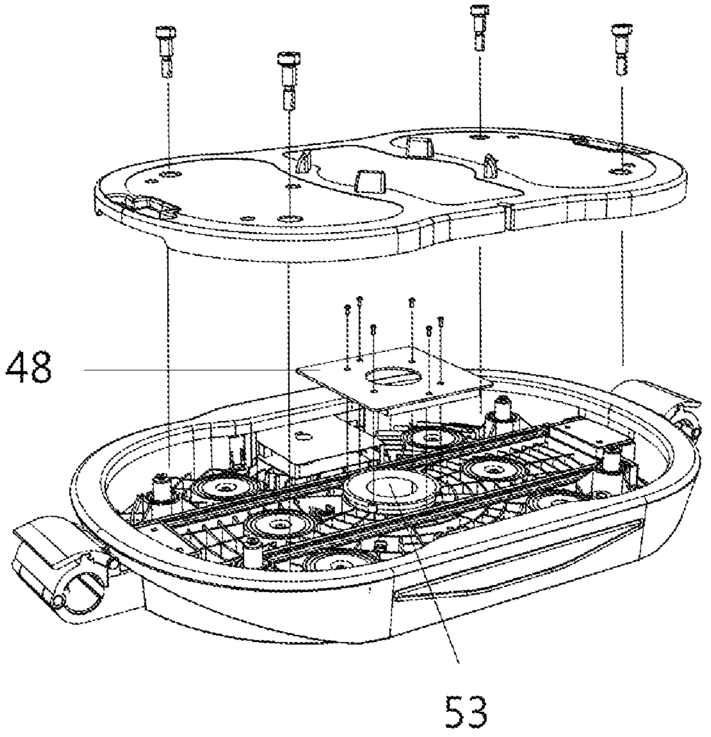
FIG. 7B is a structural exploded view of the dual-purpose physiotherapy instrument in the absence of plate body.
Figure 7C:
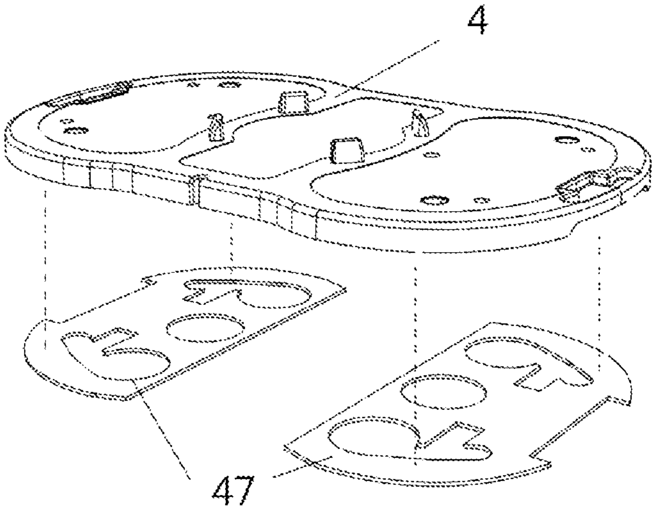
FIG. 7C is a structural view of a plate body of the dual-purpose physiotherapy instrument.

As the movable board 4 is mounted on the plate body in a detachable manner, electric energy needs to be provided for the electronic devices inside the movable board 4. FIG. 7A to FIG. 7C show an alternative embodiment of the present invention, wherein a wireless charging device is provided and comprises a battery 51 and a charging coil 52 arranged inside the movable board, a charger 53 is arranged inside the accommodating cavity structure and corresponds to the position under the wireless charging coil 52, and the control panel is electrically connected to the charger 53. In this embodiment, whether the physiotherapy instrument is in the balance or vibration mode, the charging coil 52 inside the movable board can correspond to the charger 53 and perform wireless charging to avoid operation failure of the electronic devices (e.g., WI-FI module or sensor) on the movable board due to power failure. To enhance the wireless charging capacity, a pair or more than one charging coil can be arranged inside the movable board or inside the accommodating cavity. In an alternative embodiment, refer to FIG. 7B, the charger is covered with a heat dissipation plate 48 to prevent overheating of the charger 53. The heat dissipation plate can be a metal plate arranged inside the accommodating cavity.

Further, a metal panel 46 is horizontally arranged inside the movable board 4 and correspondingly covers the electromagnetic drives 6. In fact, the magnetic field in the electromagnetic drives will affect the function of the wireless charging device. Further, an excessive magnetic field may have adverse effects on users and the metal panel 46 can serve as a magnetic shield. Further, the metal panel 46 can effectively strengthen the structure and heat dissipation function of the movable board 4.

In an alternative embodiment, refer to FIG. 7C, two metal panels 47 are placed in corresponding to the foot position of the user. As the weight of the movable board is reduced, less energy is consumed during the vibration mode. It also enhances mobility of the dual-purpose physiotherapy instrument.

Electromagnets and a control panel are arranged inside the accommodating cavity, there are a plurality of the electromagnets, which are paired with the permanent magnets, and the control panel is electrically connected to the electromagnets to control the direction of current on the electromagnets. A plurality of accommodating openings 12 accommodating the electromagnets are arranged inside the base 1, and a load-bearing rack 13 is arranged beside the accommodating openings. The outer side of the base 1 is provided with armrest clips 5, one end of each armrest clip 5 is fixedly connected to the base 1 and the other end extends outwards, and armrest interfaces for fixing the armrests are arranged on a side facing the movable board 4. In this embodiment, accommodating openings 12 are arranged inside the base 1, and electromagnets are arranged inside the accommodating openings. In this way, displacement of the electromagnets can be prevented effectively during use and after the electromagnets are energized, the main control panel can change the value and direction of the magnetic force on the electromagnets by changing the value and direction of the current on the electromagnets. The existence of the load-bearing rack raises the bearing capacity of the entire base 1 to ensure use safety. External interfaces 11 are provided on a side face of the base 1 to connect the armrest clips 5, so that the armrests can be connected to the base 1, thereby further ensuring use safety.

Figure 8:
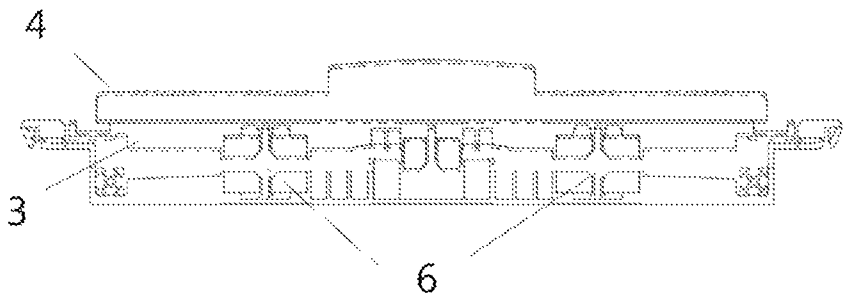
FIG. 8 is a schematic view of an embodiment of the dual-purpose physiotherapy instrument, i.e., Vibration mode.

The present invention adopts the following workflow: When the vibration mode is adopted, as shown in FIG. 8, and the movable board is mounted to the plate body 3 by facing the first surface with limit holes to the plate body, the limit holes 45 and the stoppers 31 are mutually connected in a sheathed manner and can move up and down without detachment. After user's foot soles contact the anti-skid pads 44, the main control panel is controlled to power on the electromagnets. When upward movement is needed, i.e., the movable board 4 moves away from the plate body 3, only the magnetism of the electromagnets on the side facing the movable board 4 needs to be controlled to be the same as the magnetism of the downside of the plate body 3, while the value of the magnetic force of the electromagnets can be changed by controlling current. When downward movement is needed, two methods can be adopted: The first, the electromagnets are powered in the reverse direction to change the magnetism between the two ends of the electromagnets, thereby attracting the permanent magnets and causing the movable board 4 to move downwards. The second, the electromagnets are powered off, the movable board moves towards the plate body 3 under the action of gravity, the above operation is repeated cyclically, thereby achieving up and down vibration of the movable board 4.

Figure 9:
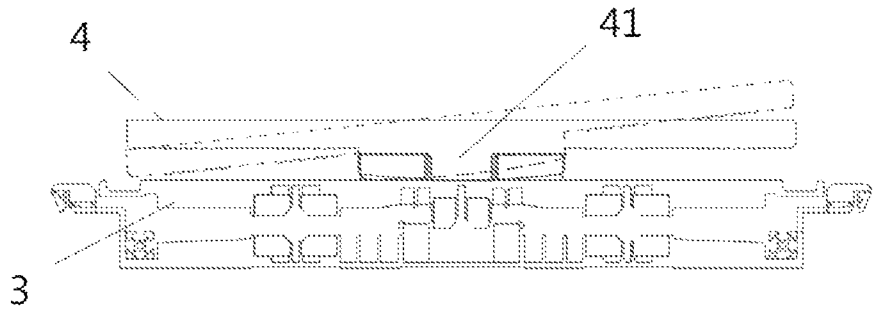
FIG. 9 is a schematic view of an embodiment of the dual-purpose physiotherapy instrument, i.e., Balance mode.

When the balance mode is adopted, as shown in FIG. 9, the movable board is turned over so that the protruding portion 41 is buckled in the stoppers. As the protruding portion is a hemispherical structure and restricted by the baffles 411, the movable board tilts to the two sides with the shifting of user's center of gravity. When the inclination is too large, the elastic cushions 42 beside the protruding portion will be pressed against the plate body 3 to prevent the movable board from continuing to tilt. The user can then adjust the center of gravity to keep the movable board horizontal, thereby practicing balancing. In a better mode, under the cooperation of the WIFI mode and the gyro sensor, measurement data can be provided in real time to obtain the inclination, time, velocity and other data of the movable board, which are used to check user's balancing performance.

Different from the vibrators on the market, the physiotherapy instrument provided by the present invention has dual purposes. In other words, it can treat bone problems through a vibrating plate and meanwhile can practice balancing. In the aspect of vibration therapy, a sensor is additionally provided inside the plate body. When a vibration therapy is started, the sensor can detect the weight of the user and then adjust vibration amplitude to avoid excessive vibration judging from different weight. In another aspect, by mounting the plate body in the reverse direction, the user can practice balancing. The sensor can be connected to the WIFI module to record user's indicators, for analysis.

The above discloses only a few specific embodiments of the present invention, but the present invention is not limited to these embodiments. All the changes that those skilled in the art can imagine shall fall within the scope of protection of the present invention.

The invention claimed is:

1. A dual-purpose physiotherapy instrument with balance and vibration functions, wherein the dual-purpose physiotherapy instrument comprises a base, electromagnetic drives, a plate body and a movable board;

the plate body is mounted on an upper end of the base to form an accommodating cavity structure between the plate body and the base for accommodating the electromagnetic drives, and a surface of the plate body away from the base is provided with stoppers;

the movable board is mounted to the plate body in a detachable manner, a first surface on the movable board is provided with limit holes that are matched with the stoppers, and a second surface opposite to the first surface is provided on the movable board;

wherein a middle part of the second surface is provided with a protruding portion, when the second surface of the movable board is mounted to the plate body in the detachable manner, the protruding portion is pressed against the plate body as a support portion to cause two ends of the movable board to swing up and down relative to the support portion under an action of the electromagnetic drives, and the stoppers cooperate with the protruding portion to limit a connecting position of the protruding portion and the plate body.

2. The dual-purpose physiotherapy instrument according to claim 1, wherein;

when the first surface of the movable board is mounted to the plate body in the detachable manner, the movable board can integrally vibrate up and down under the action of the electromagnetic drives, and the stoppers cooperate with the limit holes to limit the vibration direction of the movable board.

3. The physiotherapy instrument according to claim 1, wherein the electromagnetic drives comprise electromagnets and permanent magnets, and the electromagnets are mounted inside the accommodating cavity structure; the permanent magnets are mounted at the bottom of the plate body.

4. The physiotherapy instrument according to claim 3, wherein the electromagnets are mounted below the protruding portion a plurality of the permanent magnets are distributed symmetrically around the protruding portion.

5. The physiotherapy instrument according to claim 1, wherein the electromagnetic drives are in six groups, three groups on each of a left side and a right side and are symmetrically arranged at corresponding positions on the left and right sides of the protruding portion.

6. The physiotherapy instrument according to claim 1, wherein the protruding portion is a hemispherical structure, with a radius of 500 mm to 1,000 mm.

7. The physiotherapy instrument according to claim 1, wherein the movable board is provided with a plurality of elastic cushions on the second surface, which are distributed on both sides of the protruding portion, and the thickness of the plurality of elastic cushions is less than or equal to a radius of the protruding portion.

8. The physiotherapy instrument according to claim 1, wherein baffles are fit to two sides of the protruding portion and mutually dislocated with the stoppers.

9. The physiotherapy instrument according to claim 1, wherein a sensor is arranged inside the movable board, mounted at a position corresponding to the protruding portion and used for sensing an inclination of the movable board.

10. The physiotherapy instrument according to claim 9, wherein the physiotherapy instrument further comprises a wireless charging device, comprising a charger, a battery and a charging coil; the battery and the charging coil are arranged in the middle part of the movable board, and the charger is arranged below the wireless charging coil.

11. The physiotherapy instrument according to claim 9, wherein the physiotherapy instrument further comprises a Wi-Fi module, used for recording and transmitting in real time data of the sensor.

12. The physiotherapy instrument according to claim 1, wherein the movable board is an elongated structure, and the protruding portion is located in a middle position of the lengthwise direction of the movable board; a load-bearing rack is arranged inside the base to strengthen the support of the base to the plate body.

13. The physiotherapy instrument according to claim 1, wherein the limit holes are hole structures or through-hole structures.

14. The physiotherapy instrument according to claim 1, wherein the movable board is provided with anti-skid pads on the first surface and/or the second surface; a plurality of anti-skid stripes or anti-skid portions are arranged on the anti-skid pads.

15. The physiotherapy instrument according to claim 1, wherein a metal panel is arranged inside the movable board and covers the electromagnetic drives.

16. The physiotherapy instrument according to claim 1, wherein an outer side of the base is provided with armrest clips that are fixedly connected to the base and used for connecting the base to external objects in a fixed manner.

17. The physiotherapy instrument according to claim 1, wherein a far-infrared monitoring device is arranged inside the movable board to trigger an ON/OFF of the physiotherapy instrument.

* * * * *